US011451658B1

(12) United States Patent
Frenkel et al.

(10) Patent No.: US 11,451,658 B1
(45) Date of Patent: Sep. 20, 2022

(54) SYSTEMS AND METHODS FOR PROACTIVE FRAUDSTER EXPOSURE IN A CUSTOMER SERVICE CHANNEL

(71) Applicant: Nice Ltd., Ra'anana (IL)

(72) Inventors: Roman Frenkel, Ashdod (IL); Gal Wolbe, Kfar Saba (IL); Ofir Lavi, Tel Aviv (IL)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 17/320,295

(22) Filed: May 14, 2021

(51) Int. Cl.
*H04M 3/22* (2006.01)
*H04M 3/51* (2006.01)
*G10L 17/12* (2013.01)
*H04M 3/42* (2006.01)

(52) U.S. Cl.
CPC ........... *H04M 3/2281* (2013.01); *G10L 17/12* (2013.01); *H04M 3/42221* (2013.01); *H04M 3/5175* (2013.01); *H04M 2201/41* (2013.01)

(58) Field of Classification Search
CPC ........... H04M 3/2281; H04M 3/42221; H04M 3/5175; H04M 2201/41; G10L 17/12
See application file for complete search history.

(56) References Cited

U.S. PATENT DOCUMENTS

| | | | |
|---|---|---|---|
| 6,078,807 A * | 6/2000 | Dunn | H04M 15/00 455/565 |
| 7,299,177 B2 * | 11/2007 | Broman | G06Q 20/40 704/270.1 |
| 8,056,128 B1 | 11/2011 | Dingle et al. | |
| 8,145,562 B2 * | 3/2012 | Wasserblat | G06Q 40/02 705/38 |
| 8,225,413 B1 | 7/2012 | De et al. | |
| 9,042,867 B2 | 5/2015 | Gomar | |
| 9,620,123 B2 * | 4/2017 | Faians | H04L 63/0861 |
| 9,716,791 B1 * | 7/2017 | Moran | H04L 63/12 |
| 9,917,833 B2 | 3/2018 | Gomar | |
| 10,110,738 B1 | 10/2018 | Sawant | |
| 10,616,411 B1 * | 4/2020 | Chang | H04M 3/2281 |
| 10,659,588 B1 * | 5/2020 | Guan | H04M 3/385 |
| 10,678,899 B2 * | 6/2020 | Keret | G10L 25/51 |
| 10,685,008 B1 * | 6/2020 | Kurve | G10L 17/18 |
| 10,854,204 B2 | 12/2020 | Faians et al. | |
| 10,911,600 B1 | 2/2021 | Frenkel | |
| 2002/0010587 A1 * | 1/2002 | Pertrushin | G10L 17/26 704/275 |
| 2004/0249650 A1 | 12/2004 | Freedman | |

(Continued)

FOREIGN PATENT DOCUMENTS

| | | | | |
|---|---|---|---|---|
| EP | 2437477 A1 * | 4/2012 | | G10L 17/04 |
| WO | WO-2012042200 A1 * | 4/2012 | | G10L 15/26 |

OTHER PUBLICATIONS

Glembek, Ondrej, Lukáš Burget, and Pavel Matejka. "Voice Biometry Standard, Draft." *Brno: Speech@ FIT* (2015).

*Primary Examiner* — Akelaw Teshale
(74) *Attorney, Agent, or Firm* — Pearl Cohen Zedek Latzer Baratz LLP

(57) ABSTRACT

Methods for improved fraudster detection in a call center. A subset of a plurality of voiceprints from a plurality of interactions between callers and agents at a call center can be used as the basis for fraudster detection. A plurality of connected components that represents one or more voiceprints can be determined based on the subset of the plurality of voiceprints.

18 Claims, 8 Drawing Sheets

(56) References Cited

U.S. PATENT DOCUMENTS

| | | | |
|---|---|---|---|
| 2011/0206198 A1 | 8/2011 | Freedman | |
| 2012/0072453 A1* | 3/2012 | Guerra | H04M 3/2281 |
| | | | 707/E17.014 |
| 2013/0216029 A1 | 8/2013 | Pawlewski | |
| 2014/0254778 A1* | 9/2014 | Zeppenfeld | H04M 3/5183 |
| | | | 379/88.02 |
| 2015/0055763 A1* | 2/2015 | Guerra | H04M 3/51 |
| | | | 379/88.02 |
| 2015/0142446 A1 | 5/2015 | Gopinathan | |
| 2015/0269941 A1 | 9/2015 | Jones | |
| 2015/0279372 A1* | 10/2015 | Papierman | G09B 7/00 |
| | | | 704/273 |
| 2015/0281446 A1 | 10/2015 | Milstein | |
| 2016/0142534 A1* | 5/2016 | Guerra | H04M 3/4936 |
| | | | 379/88.02 |
| 2018/0032755 A1 | 2/2018 | Odinak | |
| 2018/0082689 A1 | 3/2018 | Khoury | |
| 2018/0152446 A1 | 5/2018 | Gomar | |
| 2018/0190296 A1* | 7/2018 | Williams | G10L 17/00 |
| 2019/0037081 A1* | 1/2019 | Rao | H04M 3/5175 |
| 2019/0373105 A1 | 12/2019 | Kung | |
| 2020/0184979 A1 | 6/2020 | Keret | |
| 2020/0250290 A1 | 8/2020 | Keret et al. | |
| 2021/0037136 A1* | 2/2021 | Michaeli | G10L 17/02 |
| 2021/0112163 A1 | 4/2021 | Frenkel | |
| 2021/0141879 A1* | 5/2021 | Calahan | G10L 17/14 |
| 2021/0358503 A1* | 11/2021 | Keret | G06N 5/04 |

* cited by examiner

FIG. 4B

From A

Determining for each of the sorted plurality of voiceprints that are nearby in the sorted list, a clustered voiceprint pair for each pair of nearby voiceprints having a difference between their corresponding Kth order moment score within a predetermined tolerance and adding the respective clustered voiceprint pair to a clustered voiceprint pair list
450

Performing a first search on the clustered voiceprint pair list to obtain a plurality of connected component voiceprints
460

Determining for each of the plurality of connected component voiceprints substantially in parallel, additional voiceprints that are filtered from the respective connected component voiceprint
470 performing a second search on the clustered voiceprint pair list to obtain a final plurality of connected component voiceprints, wherein each of the final plurality of connected components is an output that represents one or more voiceprints for use in fraud detection
480

SYSTEMS AND METHODS FOR PROACTIVE FRAUDSTER EXPOSURE IN A CUSTOMER SERVICE CHANNEL

FIELD OF THE INVENTION

The invention relates generally to the field of voice biometric security and real-time authentication, and more specifically for determining proactive fraudster exposure (e.g., likelihood a caller is a fraudster) in a customer service channel by clustering potential fraudsters and displaying to a user a ranked list of potential fraudsters to add to a watchlist database.

BACKGROUND OF THE INVENTION

Call centers are increasingly becoming a target for fraudsters via their customer service channels. Call center frauds are one of the leading threats that organizations such as financial institutions face. Fraudsters commonly attempt to retrieve information and/or change information of legitimate customers by, for example, exploiting call center agents by social engineering. For example, fraudsters can conduct an attack on a financial institution by manipulating call center agents to provide them with confidential information of legitimate customers and then use the extracted information to commit another fraud e.g., identity theft. In some scenarios, fraudsters use information from social networks and/or public information to correctly answer knowledge-based questions during a call with an agent.

There can be many types of fraudulent activity. Fraud can be performed via multiple frequent attacks, attempts on a singular legitimate customer account and/or on multiple customer accounts. The attacks can be made via different channels such as mobile application, call-center calls and/or internet, and/or on different lines of business e.g., VIP handling agents. Fraud can be a targeted to a specific individual e.g., a specific customer or on various customers in the call center.

Currently, there are systems to identify fraudsters in high volume (e.g., on the order of millions) call centers. Current systems can identify potential fraudsters and generate lists of potential fraudsters. Current systems with high call volumes can involve a run time complexity that can eventually cause the systems to be unable to run. Therefore, it can be desirable to reduce the run-time complexity of systems and methods that identify fraudsters.

SUMMARY OF THE INVENTION

One advantage of the invention can include a reduction in run-time complexity for systems that detect fraudsters. Other advantages of the invention can include an ability to handle a higher volume of calls, e.g., on the order of hundreds of millions, due to, for example, a reduction of run-time complexity. Other advantages of the invention can include larger more homogeneous potential fraudster clusters.

In one aspect, the invention involves a computerized method for improved fraudster detection in a call center. The method can also involve receiving, via a computing device, a plurality of voiceprints from a plurality of interactions between callers and agents at the call center. The method can also involve determining, via the computer, a subset of the plurality of voiceprints. The method can also involve determining, via the computer, for each of the plurality of voiceprints, a kth order moment score based on the subset of the plurality of voiceprints. The method can also involve sorting, via the computer, the plurality of voiceprints by their corresponding kth order moment score to obtain a sorted list of voiceprints. The method can also involve determining, via the computer, for each of the sorted plurality of voiceprints that are nearby in the sorted list, a clustered voiceprint pair for each pair of nearby voiceprints having a difference between their corresponding kth order moment score within a predetermined tolerance and adding the respective clustered voiceprint pair to a clustered voiceprint pair list. The method can also involve performing, by the computing device, a first search on the clustered voiceprint pair list to obtain a plurality of connected component voiceprints. The method can also involve determining, by the computing device, for each of the plurality of connected component voiceprints substantially in parallel, additional voiceprints that are filtered from the respective connected component voiceprint. The method can also involve performing, by the computing device, a second search on the clustered voiceprint pair list to obtain a final plurality of connected component voiceprints, wherein each of the final plurality of connected components is an output that represents one or more voiceprints for use in fraud detection.

In some embodiments, the kth order moment score is a mean score and a standard deviation score. In some embodiments, the sorting is based on the mean score. In some embodiments, voiceprints that are nearby are voiceprints that are within a fixed window, neighbors, or any combination thereof. In some embodiments, a clustered voiceprint pair has a difference between corresponding mean score within a mean score threshold.

In some embodiments, for each of the clustered voiceprint pairs in the clustered voiceprint pair list, if a difference between the corresponding standard deviation scores are above a predetermined threshold, removing, by the computing device, the respective clustered voiceprint pair.

In some embodiments, the first search or the second search is a breadth-first-search, depth-first-search, or any combination thereof. In some embodiments, the subset of the plurality of voiceprints is based on an input value. In some embodiments, receiving the plurality of voiceprints further comprises recording calls received at the call center between the callers and agents in an audio file.

In another aspect, the invention includes a non-transitory computer program product comprising instructions which, when the program is executed cause the computer to receive a plurality of voiceprints from a plurality of interactions between callers and agents at the call center. The computer can also be caused to determine a subset of the plurality of voiceprints. The computer can also be caused to determine for each of the plurality of voiceprints, a kth order moment score based on the subset of the plurality of voiceprints. The computer can also be caused to sort the plurality of voiceprints by their corresponding kth order moment score to obtain a sorted list of voiceprints. The computer can also be caused to determine for each of the sorted plurality of voiceprints that are nearby in the sorted list, a clustered voiceprint pair for each pair of nearby voiceprints having a difference between their corresponding kth order moment score within a predetermined tolerance and adding the respective clustered voiceprint pair to a clustered voiceprint pair list. The computer can also be caused to perform a first search on the clustered voiceprint pair list to obtain a plurality of connected component voiceprints. The computer can also be caused to determine for each of the plurality of connected component voiceprints substantially in parallel, additional voiceprints that are filtered from the respective connected component voiceprint. The computer can also be caused to perform a second search on the clustered voiceprint pair list to obtain a final plurality of connected component voiceprints, wherein each of the final plurality of connected components is an output that represents one or more voiceprints for use in fraud detection.

In some embodiments, the kth order moment score is a mean score and a standard deviation score. In some embodiments, the sorting is based on the mean score. In some embodiments, voiceprints that are nearby are voiceprints that are within a fixed window, neighbors, or any combination thereof.

In some embodiments, a clustered voiceprint pair has a difference between corresponding mean score within a mean score threshold. In some embodiments, for each of the clustered voiceprint pairs in the clustered voiceprint pair list, if a difference between the corresponding standard deviation scores are above a predetermined threshold, removing, by the computing device, the respective clustered voiceprint pair.

In some embodiments, the first search or the second search is a breadth-first-search, depth-first-search, or any combination thereof. In some embodiments, subset of the plurality of voiceprints is based on an input value. In some embodiments, receiving the plurality of voiceprints further comprises recording calls received at the call center between the callers and agents in an audio file.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
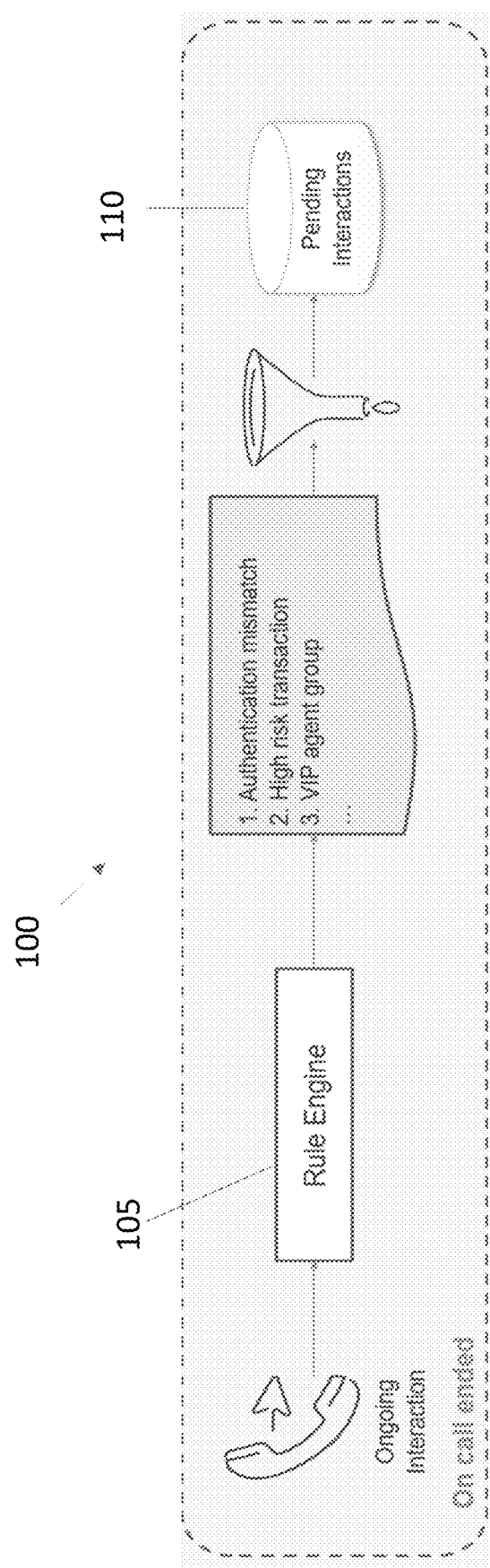
FIG. 1 schematically illustrates a calls collection engine, according to some embodiments of the invention.

FIG. 1 schematically illustrates a calls collection engine 100, according to some embodiments of the invention. The calls collection engine 100 includes a rule engine 105 and a pending interactions database 110. The rules engine 105 can store one or more rules to be applied to one or more call interactions of a call center. The pending interactions database 110 can store one or more pending interactions of the call center.

The call interactions can include one or more conversations between a customer and an agent, a customer and multiple agents, an agent and an agent, an agent and multiple agents, or any combination thereof. The call interaction can be a recorded audio file of the one or more conversations. The call interaction can be a recorded phone call, audio extracted from a video call, audio generated from a chat window, a recorded chat, and/or input from a platform that records a call interaction.

During operation, in a customer service center, one or more call interactions can be recorded and stored in a database (not shown) of recorded calls. The rules engine 105 can receive call interactions from a database of recorded calls where some of the calls can be ongoing calls. For example, in some scenarios, regulations can dictate that all calls are to be stored. In some embodiments, ongoing calls are not stored in the database but instead are simply transmitted to the rules engine 105. In some embodiments, call interactions that occurred within a predetermined time frame are selected. For example, call interactions that are within the past 5 years can be selected. The predetermined time frame can be input by a user.

The rules engine 105 can apply a set of rules (e.g., as defined by a user) stored in the rules engine 105 to the received call interactions and determines which call interactions are to be further analyzed based on the rules. In some embodiments, one or more rules can be selected by a user or automatically based on various factors. For example, the factors can include time windows, meta data and/or business data.

In various embodiments, the set of rules can specify that call interactions that satisfy the following are to be further analyzed: (i) The speaker got mismatch results during an authentication procedure; (ii) The speaker is asked to perform a high-risk transaction; (iii) The agent that handled the call is associated to a special group that should always be monitored, e.g., VIP customers; (iv) business data; (v) behavioral flows of the speaker; (vi) call content analysis; and/or (vi) frequency of the call interactions.

A mismatch during customer authentication can occur, for example, when in the authentication procedure the data that the user provides does not match the authentication data that is saved in the organizations database. Business data can include, for example, high-risk transactions such as money transfer when the organization is a financial institution. Agents that are associated with a risk group or line of business can be agents which provide service to VIP customers. A call content analysis can be related to search for keywords and/or phrases. Frequency of the call interactions can relate to a number of call interactions from the same speaker in a predefined time interval.

During operation, a call that is in progress can be recorded, and once the call ends, the recorded call, (e.g., the call interaction) can be sent to the rule engine 105 to see if the call interaction matches to one or more of the predefined rules. If the call interaction matches one or more of the predefined rules, then it can be stored in the interactions database 110. The interactions in the interaction database 110 can be later analyzed, as discussed in further detail below in FIG. 2.

Figure 2:
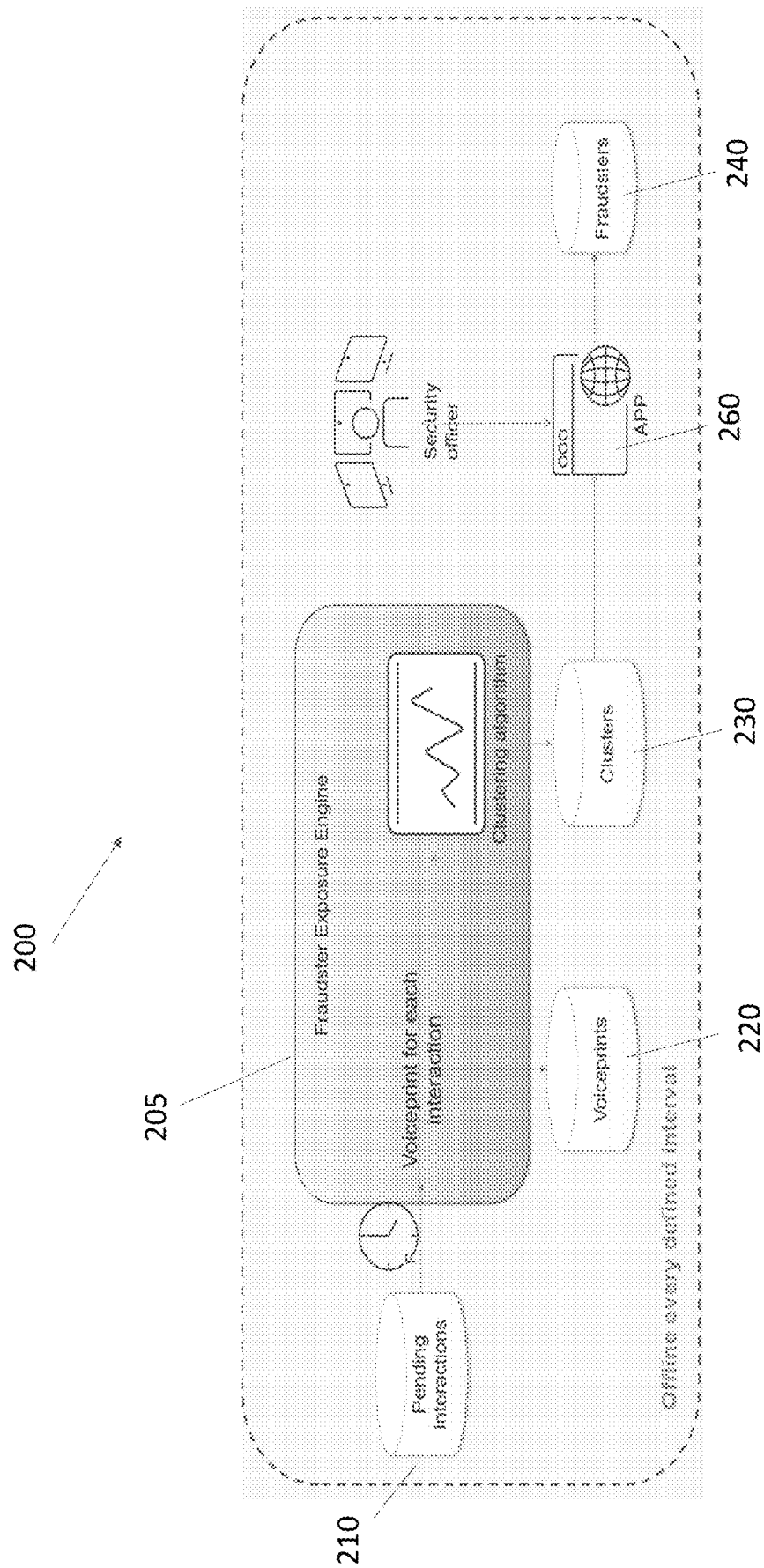
FIG. 2 schematically illustrates a proactive fraud exposure engine, according to some embodiments of the invention.

FIG. 2 schematically illustrates a proactive fraud exposure (PFE) engine 200, according to some embodiments of the invention. As described above with respect to FIG. 1, a call interaction can be stored in interactions database 210 (e.g., 110 in FIG. 1). Once the call interaction is stored in the interactions database, the PFE engine 200 can retrieve and read the information of the call interaction from the interactions database 210 to analyze it.

The PFE engine 200 an include the pending interactions database 210, a voiceprints database 220, a clusters database 230, a fraudsters database 240, an application 260 and a fraudster database 240.

One or more users can be in communication with the PFE engine 200. The users can include a security officer. The security office can add data of details of fraudsters to be added to the watchlist database 240 and/or rules to the rules engine (as described above in FIG. 1).

In various embodiments, the calls collection engine 100 in FIG. 1 and PFE engine 200 can include one or more processors, memories, output devices, input devices, communication circuitry and/or interface module for wired and/ or wireless communication with any other computerized device over a communication network, for example, as illustrated in FIG. 3B, described in further detail hereinbelow.

During operation, the fraud exposure engine 205 can generate a voiceprint for each call interaction in the interactions database 210 to be stored in the voiceprints database 220 (e.g., using a processor and/or memory).

The fraud exposure engine 205 can group the voiceprints into groups that represent a repeating speaker's voice based on the generated voiceprints. The grouping is described in further detail below with respect to FIG. 5.

The groupings of voiceprints can represent a list of potential fraudsters. The list of potential fraudsters can be transmitted to the application 260 (e.g., over a communication network), to be displayed to a user via a display unit 250.

The user can be a security officer that can review the list of potential fraudsters and listen to the call that is in the respective grouping. If the security officer suspects that the call has been made by an actual fraudster, the security officer can add the call and the respective fraudsters information via the application 260 to the watchlist database 240. The application 260 may be web application or desktop application.

The details of the fraudster can be stored in the watchlist database 240 such that when a fraudster calls the customer service center, they can be detected in real-time. An alert can be sent to the users e.g., agents and/or the security officers upon the detection for further monitoring and/or analysis or alternatively the call may be blocked.

Figure 3:
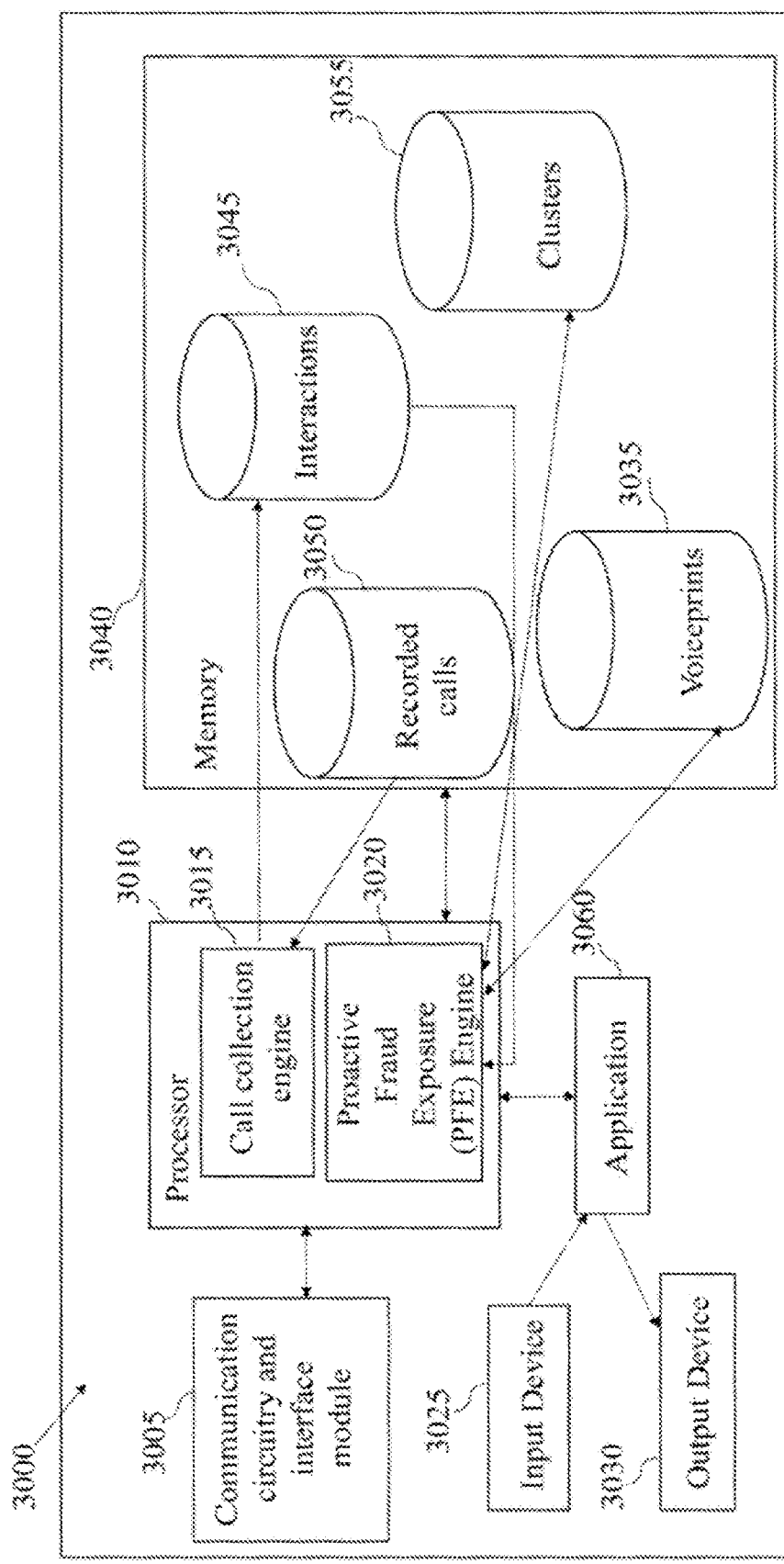
FIG. 3 is a block diagram of a system for proactive fraudster exposure in a customer service center having multiple channels, in accordance with some embodiments the invention.

FIG. 3 is a block diagram of a system 3000 for proactive fraudster exposure in a customer service center having multiple channels, in accordance with some embodiments the invention.

The system 3000 includes a processor 3010, a memory 3040, an input device 3025, an output device 3030, an application 3060 and a communication circuitry and interface module 300. Each of the components in system 3000 can be coupled wired or wirelessly, for wired and/or wireless communication with any other computerized device over a communication network (e.g., the internet).

The processor 3010 can include a call collection engine 3015 and an PFE engine 3020 (e.g., as described in FIG. 1 and FIG. 2, respectively above). The memory 3040 can include a recorded calls memory 3050, a interactions memory 3045, a voiceprints memory 3035, and a clusters memory 3055.

During operation, the call collection engine 3015 can receive call interactions and transmit them to the PFE engine 3020. The PFE engine 3020 can generate voiceprints, for example, of a speaker out of an audio sample. The voiceprint can be stored in the voiceprints database 3035. The processor 3010 can be configured to operate in accordance with programmed instructions stored in memory 3040. The processor 3010 can be implemented on one or more processing units, e.g., of one or more computers.

The processor 3010 via the PFE 3020 can communicate with the output device 3030 via the application 3060. For example, the output device 3030 may include a computer monitor or screen and the processor 3010 may communicate with a screen of the output device 3030. In another example, the output device 3030 may include a printer, display panel, speaker, or another device capable of producing visible, audible, or tactile output.

The processor 3010 via PFE 3020 can communicate with an input device such as input device 3025 via application 3060. For example, the input device 3025 may include one or more of a keyboard, keypad or pointing device to allow a user to input data and/or instructions for operation of the processor 3010. In some embodiments, the user is a security officer and the data may be details of fraudsters to be added to, e.g., the watchlist database 240 as described above in FIG. 2. In some embodiments, the instructions are the rules that are applied on the call interactions and determine which call interactions in the recorded calls database 3050 are further analyzed by the PFE engine 3020.

A user can specify the rules according to which call interactions in the recorded calls database 3050 are stored in interactions database 3045, via the application 3060. In some embodiments, a user can receive a list of potential fraudsters and directly update the watchlist database 240 via application 3060 (also shown as application 260 in FIG. 2).

The calls collection engine 3015 can receive call interactions from a database of recorded calls such as recorded calls database 3050, where some of the calls may be ongoing calls.

The memory 3040 can include one or more volatile or nonvolatile memory devices. The memory 3040 can be utilized to store, for example, programmed instructions for operation of the processor 3010, data and/or parameters for use by the processor 3010 during operation, and/or results of the operation of the processor 3010.

As described above, voiceprints can be grouped such that fraudsters can be identified. In some scenarios, there can be a large volume of call interactions, such that it can be desirable to group the voiceprints for fraud detection to reduce run time complexity. For example, is some scenarios, if N is the number of call interactions, current grouping (e.g., clustering) can cause a run time complexity of $N^2$. In some embodiments, it can be possible to reduce the run time complexity by, for example, using parallel programming on a subset of the N.

Figure 4:
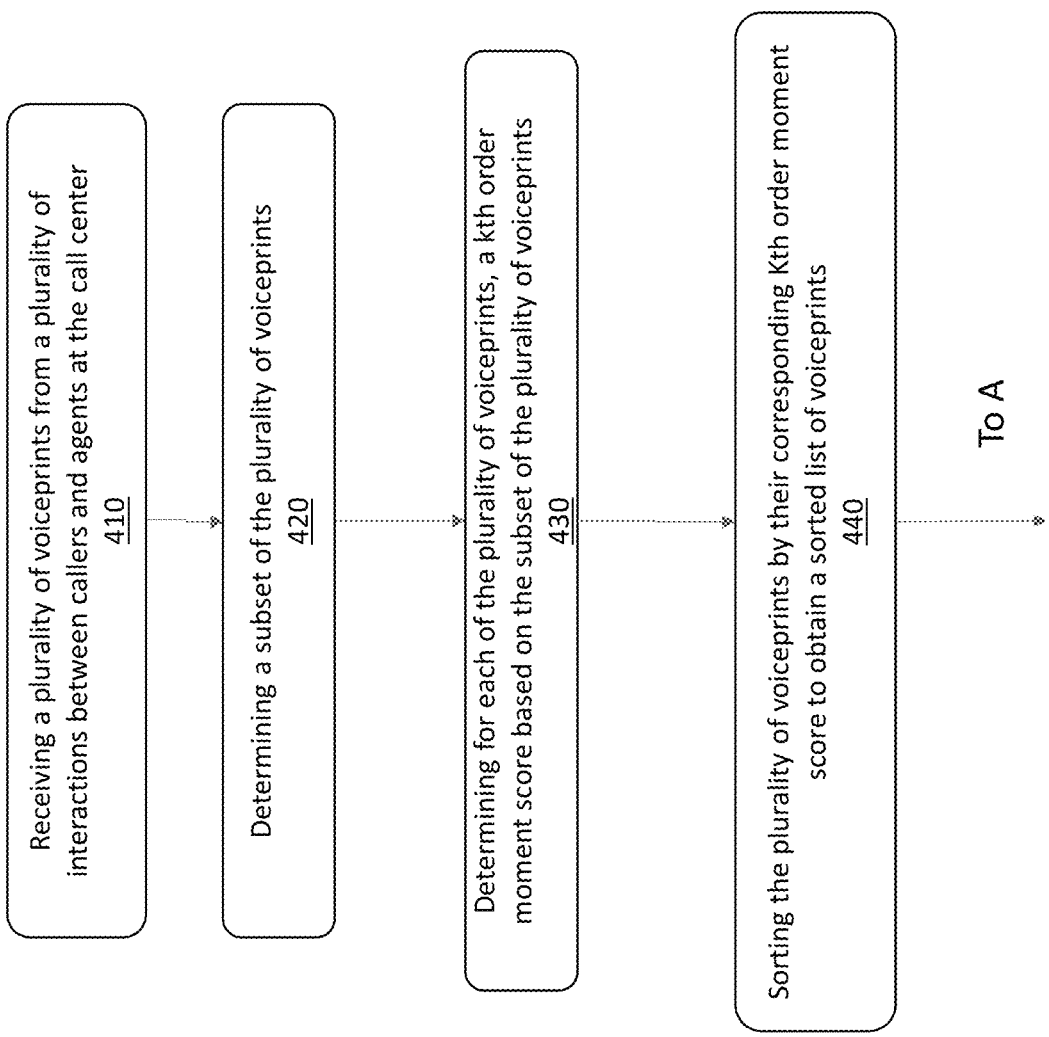
FIG. 4A and FIG. 4B show a flow chart for a method for improved fraudster detection in a call center, according to some embodiments of the invention.

FIG. 4A and FIG. 4B show is a flow chart for a method for improved fraudster detection in a call center, according to some embodiments of the invention. The method can be executed, for example, by the fraud exposure engine 205 as described above in FIG. 2. The method can be used, for example, by the fraud exposure engine 205 to determine grouping (e.g., clusters) from the voiceprints in the voiceprints database 220 to be stored in cluster database 230, and to be transmitted to the application 260, as described above in FIG. 2. The method can be used, for example, by the PFE 3020 to determine grouping (e.g., clusters) from the voiceprints in the voiceprints database 3035 to be stored in cluster database 3055, and to be transmitted to the application 3060, as described above in FIG. 3.

The method can involve, receiving a plurality of voiceprints (e.g., voiceprints from voiceprint database 220 as described above in FIG. 2) from a plurality of interactions (e.g., interactions from pending interactions database 210 as described above in FIG. 2) between callers and agents at the call center. (Step 410). In various embodiments, the interactions are between callers and agents and/or agents and agents.

In some embodiments, the plurality of voiceprints are recordings of calls received at the call center between the callers and agents that are stored in an audio file.

The method can also involve determining a subset of the plurality of voiceprints (Step 420). The subset of the plurality of voiceprints can be input by a user. For example, N plurality of voiceprints, where N is an integer value, K is the number of voiceprints in the subset of the plurality of voiceprints. The number K of voiceprints in the subset of the plurality of voiceprints can be input by a user. The number K can be determined based on a statistical hypothesis test that is a Student's t-distribution. In some embodiments, the number K can be several thousand.

The K voiceprints selected from the N plurality of voiceprints can be randomly selected or selected by a user. For example, assume N=100, and K=50, every other voiceprint can be selected, voiceprints 1-50 can be selected, voiceprints 1-30, and 40-60 can be selected, or any subset of the 100 voiceprints that produces a subset of 50 can be selected, as specified by the user or selected randomly.

The method can also involve determining, via the computer, for each of the plurality of voiceprints, a kth order moment score based on the subset of the plurality of voiceprints (Step 430). In some embodiments, the kth order moment score is a probability distribution, where the first moment score is a mean score, the second moment score is a variance (e.g., standard deviation^2), the third moment score is skewness and the fourth moment score is kurtosis. In some embodiments, for each voiceprint, a mean score and a standard deviation score is determined. In some embodiments, the mean score can be determined as follows:

For i from 1 to N:
    TmpSum=0
    TmpSumSquarred=0
    For j from 1 to K:
        Value=Score(V[i],V[j])
        TmpSum+=Value
        TmpSumSquarred+=Value^2 where V[i],V[j] are voiceprints in index i and j, and Score determines a similarity between the voiceprints and produces a biometric score (e.g., ranging from −50 to 50), TmpSum/K is the mean score. In some embodiments, a matrix can be determined. The matrix can be a N by K matrix, with N columns and K rows, where N is the number of voiceprints in the plurality of voiceprints and K is the number of voiceprints in the subset of voiceprints. For each row, a standard deviation score and mean score can be determined. The standard deviation score can be determined as follows:

$$STD(X) = \sqrt{\frac{\sum_{i=1}^{K}(x_i - \mu)^2}{N}} \quad \text{EQN. 1}$$

$$N*STD(X) =$$
$$\sum_{i=1}^{K}(x_i - \mu)^2 = \sum_{i=1}^{K}[x_i^2 - 2x_i\mu + \mu^2] = \sum_{i=1}^{K}x_i^2 - 2\mu\sum_{i=1}^{K}x_i + K\mu^2 \quad \text{EQN. 2}$$

where x is a vector of biometric scores for a particular row, μ is a mean value of x, N is the number of voiceprints in the plurality of voiceprints, K is the number of voiceprints in the subset of voiceprints, and STD(x) is the standard deviation score and (the sum of xi from 1 to K)/K is the mean score.

The method can also involve sorting, via the computer, the plurality of voiceprints by their corresponding Kth order moment score to obtain a sorted list of voiceprints (Step 440). For example, for a kth order moment that is a probability distribution, where the first moment score is a mean, the sorting can be based on the first moment score. In some embodiments, the sorting is based on the mean score. In some embodiments, the sorting is based on the standard deviation. The sorting can be done in ascending or descending order.

The method can also involve determining, via the computer, for each of the sorted plurality of voiceprints that are nearby in the sorted list, a clustered voiceprint pair for each pair of nearby voiceprints having a difference between their corresponding Kth order moment score within a predetermined tolerance and adding the respective clustered voiceprint pair to a clustered voiceprint pair list (Step 450). The predetermined tolerance can be a user input. The predetermined tolerance can be an integer value. The predetermined tolerance can be a floating value. The predetermined tolerance can be a range. The predetermined tolerance can be 1.5 for a standard deviation score and 4 for a mean score. For example, turning to FIG. 5, FIG. 5 is a diagram showing an example of a method for creating a clustered voiceprint pair list according to some embodiments of the invention.

Figure 5:
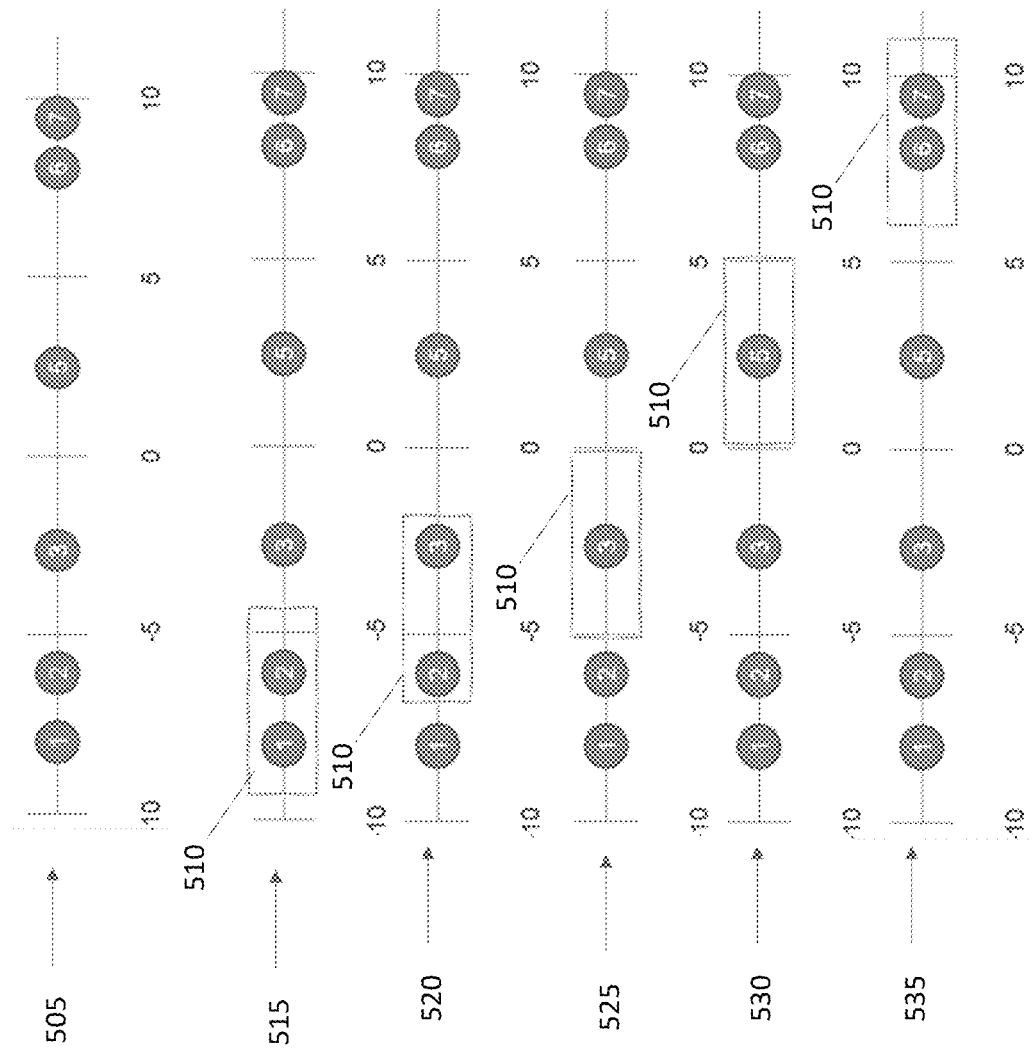
FIG. 5 is a diagram showing an example of a method for creating a clustered voiceprint pair list according to some embodiments of the invention.

In the example of FIG. 5, assume a list of voiceprints, voiceprints 1, 2, 3, 5, 6, 7, that is subset K of the plurality of voiceprints N, sorted by a mean score that is between −10 and 10 determined as described above in FIG. 4A. The voiceprints 1, 2, 3, 5, 6, 7 are sorted along an axis as shown in Step 505. A fixed window 510 is applied to each voiceprint and its neighbor if possible, to determine whether the voiceprints are within the predetermined tolerance (e.g., the width of the fixed window). The predetermined tolerance can be input by a user. The predetermined tolerance for mean score values can be 4.

The fixed window is applied to voiceprint 1 (Step 515). Voiceprints 1 and 2 are within the fixed window, and thus they are added to the clustering voiceprint pair list. The fixed window is applied to voiceprint 2 (Step 520). Voiceprints 2 and 3 are within the fixed window, and thus they are added to the clustering voiceprint pair list. The fixed window is applied to voiceprint list 3 (Step 525). Only voiceprint 3 is within the window, thus, there is no pair to add to the clustering voiceprint pair list as a result of applying the fixed window to voiceprint 3. The fixed window is applied to voiceprint list 5 (Step 530). Only voiceprint 5 is within the window, thus, there is no pair to add to the clustering voiceprint pair list as a result of applying the fixed window to voiceprint 5. The fixed window is applied to voiceprint 6 (Step 535). Voiceprints 6 and 7 are within the fixed window, and thus they are added to the clustering voiceprint pair list. The resulting clustering voiceprint pair list is (1,2), (2,3) and (6,7).

In some embodiments, two or more voiceprints can be within the fixed window for a given voiceprint. In these embodiments, each voiceprint that is within the fixed window for a given voiceprint is a unique pair an added to the clustering voiceprint pair list.

In some embodiments, the determination as to whether two voiceprints qualify as a clustering voiceprint pair is based on a different between their respective mean scores within a mean score threshold.

The computerized method of claim 2 further comprising for each of the clustered voiceprint pairs in the clustered voiceprint pair list, if a difference between the corresponding standard deviation scores are above a predetermined threshold, removing, by the computing device, the respective clustered voiceprint pair.

In some embodiments, the method involves filtering each of the clustered voiceprint pairs that has a difference in standard deviation scores above a predetermined threshold. The predetermined threshold can be input by a user. The predetermined threshold can be 1.5.

The method can also involve performing a first search on the clustered voiceprint pair list to obtain a plurality of connected component voiceprints (Step 460).

The first search can be a breadth-first-search and/or a depth-first-search. The plurality of connected component voiceprints can include multiple separate threads where each thread has a voiceprint as a vertex and a pair of voiceprints is an edge. In this manner, operation in parallel, and on multiple threads can occur.

The method can also involve determining for each of the plurality of connected component voiceprints substantially in parallel, additional voiceprints that are filtered from the respective connected component voiceprint (Step 470). For example, voiceprints pairs that are clustered can be filtered into a separate cluster (e.g., a cluster of size 1) if they fall below a biometric score threshold. A voiceprint pair can fall below a biometric score threshold if [V1,V2]<Max(Th[row V1], Th[row V2]).

The method can also involve performing a second search on the clustered voiceprint pair list to obtain a final plurality of connected component voiceprints, wherein each of the final plurality of connected components is an output that represents one or more voiceprints for use in fraud detection (Step 480). The plurality of connected components can be input to the clusters database 230 and/or 3055, as described above in FIG. 2 and FIG. 3, respectively.

The second search can be a breadth-first-search and/or depth-first-search.

Figure 6:
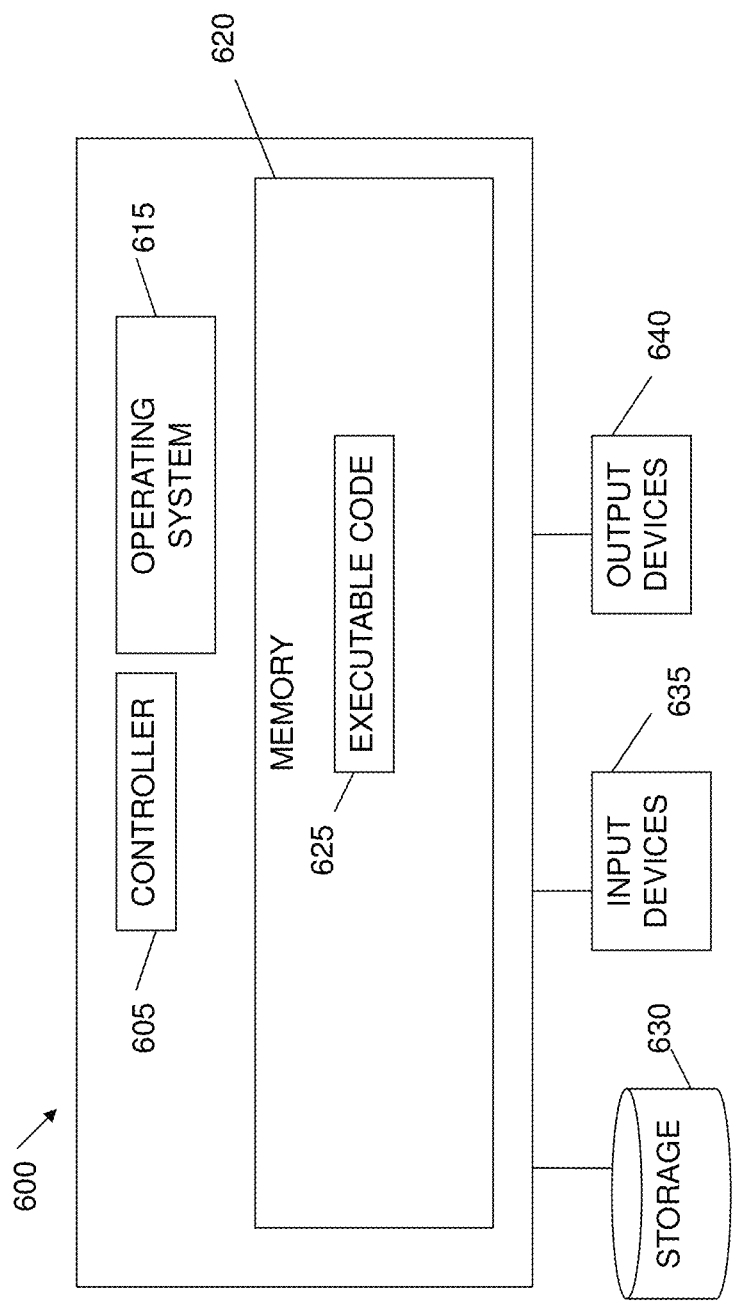
FIG. 6 shows a block diagram of a computing device 600 which can be used with embodiments of the invention.

FIG. 6 shows a block diagram of a computing device 600 which can be used with embodiments of the invention. Computing device 600 can include a controller or processor 605 that can be or include, for example, one or more central processing unit processor(s) (CPU), one or more Graphics Processing Unit(s) (GPU or GPGPU), a chip or any suitable computing or computational device, an operating system 615, a memory 620, a storage 630, input devices 635 and output devices 640.

Operating system 615 can be or can include any code segment designed and/or configured to perform tasks involving coordination, scheduling, arbitration, supervising, controlling or otherwise managing operation of computing device 600, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 can be or can include a plurality of, possibly different memory units. Memory 620 can store for example, instructions to carry out a method (e.g. code 625), and/or data such as user responses, interruptions, etc.

Executable code 625 can be any executable code, e.g., an application, a program, a process, task or script. Executable code 625 can be executed by controller 605 possibly under control of operating system 615. For example, executable code 625 can when executed cause masking of personally identifiable information (PII), according to embodiments of the invention. In some embodiments, more than one computing device 600 or components of device 600 can be used for multiple functions described herein. For the various modules and functions described herein, one or more computing devices 600 or components of computing device 600 can be used. Devices that include components similar or different to those included in computing device 600 can be used, and can be connected to a network and used as a system. One or more processor(s) 405 can be configured to carry out embodiments of the invention by for example executing software or code. Storage 630 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 630 and can be loaded from storage 630 into a memory 620 where it can be processed by controller 605. In some embodiments, some of the components shown in FIG. 6 can be omitted.

Input devices 635 can be or can include for example a mouse, a keyboard, a touch screen or pad or any suitable input device. It will be recognized that any suitable number of input devices can be operatively connected to computing device 600 as shown by block 635. Output devices 640 can include one or more displays, speakers and/or any other suitable output devices. It will be recognized that any suitable number of output devices can be operatively connected to computing device 600 as shown by block 640. Any applicable input/output (I/O) devices can be connected to computing device 600, for example, a wired or wireless network interface card (NIC), a modem, printer or facsimile machine, a universal serial bus (USB) device or external hard drive can be included in input devices 635 and/or output devices 640.

Embodiments of the invention can include one or more article(s) (e.g., memory 620 or storage 630) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 7:
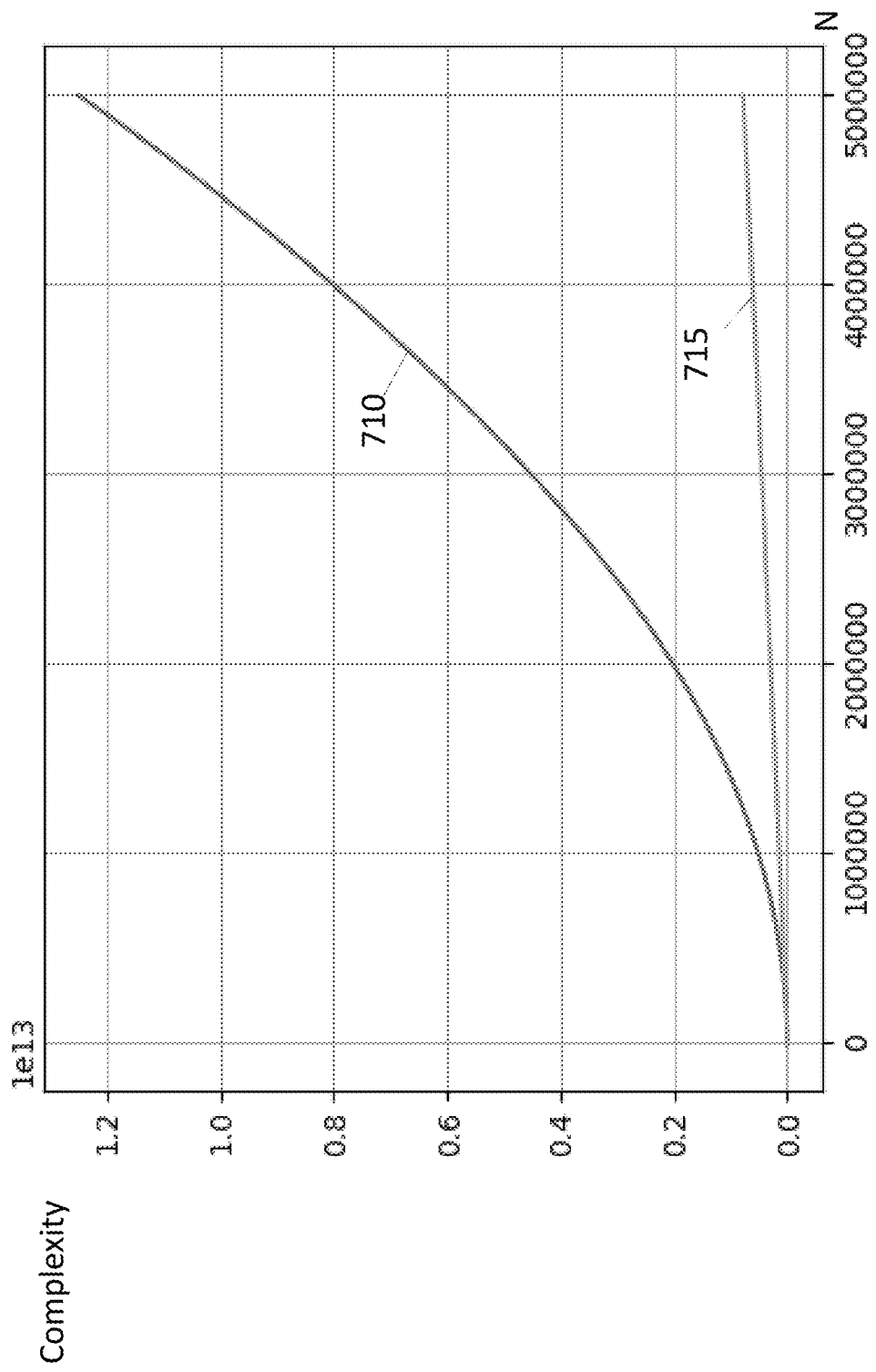
FIG. 7 is a graph showing example results, according to some embodiments of the invention.

FIG. 7 is a graph showing example results of complexity vs. the number of interactions, according to some embodiments of the invention. As shown in FIG. 7, line 715 is an example of complexity vs. the number of interactions for a method for improved fraudster detection in a call center according to the method of FIG. 4A and FIG. 4B, whereas line 710 is an example of for methods according to the prior art. In this manner, it can be seen that by, for example, reducing a number of interaction (e.g., creating the subset of the plurality of interactions) and/or performing parallel processing on a smaller number of interactions (e.g., by creating the connected components and further filtering), it the complexity of grouping the voiceprints for fraudster detection can be significantly reduced. In this manner, the invention can allow for an increase in the volume of calls to a call center while maintaining a relatively low level of complexity.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above-described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments, the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A computerized method for improved fraudster detection in a call center, the method comprising:
   receiving, via a computing device, a plurality of voiceprints from a plurality of interactions between callers and agents at the call center;
   determining, via the computer, a subset of the plurality of voiceprints;
   determining, via the computer, for each of the plurality of voiceprints, a kth order moment score based on the subset of the plurality of voiceprints;

sorting, via the computer, the plurality of voiceprints by their corresponding kth order moment score to obtain a sorted list of voiceprints;

determining, via the computer, for each of the sorted plurality of voiceprints that are nearby in the sorted list, a clustered voiceprint pair for each pair of nearby voiceprints having a difference between their corresponding kth order moment score within a predetermined tolerance and adding the respective clustered voiceprint pair to a clustered voiceprint pair list;

performing, by the computing device, a first search on the clustered voiceprint pair list to obtain a plurality of connected component voiceprints;

determining, by the computing device, for each of the plurality of connected component voiceprints substantially in parallel, additional voiceprints that are filtered from the respective connected component voiceprint; and performing, by the computing device, a second search on the clustered voiceprint pair list to obtain a final plurality of connected component voiceprints, wherein each of the final plurality of connected components is an output that represents one or more voiceprints for use in fraud detection.

2. The computerized method of claim 1 wherein the kth order moment score is a mean score and a standard deviation score.

3. The computerized method of claim 2 wherein the sorting is based on the mean score.

4. The computerized method of claim 2 wherein voiceprints that are nearby are voiceprints that are within a fixed window, neighbors, or any combination thereof.

5. The computerized method of claim 2 wherein a clustered voiceprint pair has a difference between corresponding mean score within a mean score threshold.

6. The computerized method of claim 2 further comprising for each of the clustered voiceprint pairs in the clustered voiceprint pair list, if a difference between the corresponding standard deviation scores are above a predetermined threshold, removing, by the computing device, the respective clustered voiceprint pair.

7. The computerized method of claim 1 wherein the first search or the second search is a breadth-first-search, depth-first-search, or any combination thereof.

8. The computerized method of claim 1 wherein the subset of the plurality of voiceprints is based on an input value.

9. The computerized method of claim 1 wherein receiving the plurality of voiceprints further comprises recording calls received at the call center between the callers and agents in an audio file.

10. A non-transitory computer program product comprising instructions which, when the program is executed cause the computer to:

receive a plurality of voiceprints from a plurality of interactions between callers and agents at the call center;

determine a subset of the plurality of voiceprints;

determine for each of the plurality of voiceprints, a kth order moment score based on the subset of the plurality of voiceprints;

sort the plurality of voiceprints by their corresponding kth order moment score to obtain a sorted list of voiceprints;

determine for each of the sorted plurality of voiceprints that are nearby in the sorted list, a clustered voiceprint pair for each pair of nearby voiceprints having a difference between their corresponding kth order moment score within a predetermined tolerance and adding the respective clustered voiceprint pair to a clustered voiceprint pair list;

perform a first search on the clustered voiceprint pair list to obtain a plurality of connected component voiceprints;

determine for each of the plurality of connected component voiceprints substantially in parallel, additional voiceprints that are filtered from the respective connected component voiceprint; and perform a second search on the clustered voiceprint pair list to obtain a final plurality of connected component voiceprints, wherein each of the final plurality of connected components is an output that represents one or more voiceprints for use in fraud detection.

11. The computer program product of claim 10 wherein the kth order moment score is a mean score and a standard deviation score.

12. The computer program product of claim 11 wherein the sorting is based on the mean score.

13. The computer program product of claim 11 wherein voiceprints that are nearby are voiceprints that are within a fixed window, neighbors, or any combination thereof.

14. The computer program product of claim 11 wherein a clustered voiceprint pair has a difference between corresponding mean score within a mean score threshold.

15. The computer program product of claim 11 further comprising for each of the clustered voiceprint pairs in the clustered voiceprint pair list, if a difference between the corresponding standard deviation scores are above a predetermined threshold, removing, by the computing device, the respective clustered voiceprint pair.

16. The computer program product of claim 10 wherein the first search or the second search is a breadth-first-search, depth-first-search, or any combination thereof.

17. The computer program product of claim 10 wherein the subset of the plurality of voiceprints is based on an input value.

18. The computer program product of claim 10 wherein receiving the plurality of voiceprints further comprises recording calls received at the call center between the callers and agents in an audio file.

* * * * *